United States Patent [19]

Herzberger

[11] Patent Number: 5,228,065
[45] Date of Patent: Jul. 13, 1993

[54] ARRANGEMENT FOR PRODUCING A SYNCHRONIZING PULSE

[75] Inventor: Achim Herzberger, Nürnberg, Fed. Rep. of Germany

[73] Assignee: U.S. Philips Corporation, New York, N.Y.

[21] Appl. No.: 776,152

[22] Filed: Oct. 15, 1991

[30] Foreign Application Priority Data

Oct. 15, 1990 [DE] Fed. Rep. of Germany ....... 4032651

[51] Int. Cl.[5] .............................................. H04L 7/00
[52] U.S. Cl. .................................. 375/114; 375/116; 370/105.4
[58] Field of Search .............................. 375/114, 116; 370/105.4, 105.5, 106; 340/825.65

[56] References Cited

U.S. PATENT DOCUMENTS

| | | | |
|---|---|---|---|
| 4,298,987 | 11/1981 | Stattel et al. | 375/116 |
| 4,500,992 | 2/1985 | Floderer | 370/105.4 |
| 4,542,503 | 9/1985 | Floderer et al. | 370/105.4 |
| 4,847,877 | 7/1989 | Besseyre | 375/114 |
| 4,984,238 | 1/1991 | Watanabe et al. | 370/105.4 |
| 5,058,141 | 10/1991 | Kem et al. | 375/116 |

FOREIGN PATENT DOCUMENTS

0103163 12/1984 European Pat. Off. .

Primary Examiner—Curtis Kuntz
Assistant Examiner—T. Ghebretinsae
Attorney, Agent, or Firm—David R. Treacy

[57] ABSTRACT

A synchronizing pulse is produced upon detection of a frame codeword or frame-structured binary signal consisting of a first word repeated a plurality of times and at least one second word. A demultiplexer divides the incoming signal into n words which are advanced in parallel through n shift registers of a first memory matrix, followed by the next n words, and so on. A decoder determines whether the first word is stored in each register, and increments a respective one of n counters when the word is found. An addressing logic transforms the output into a binary number which controls a multiplexer which, in turn controls arrangement of bits in a second memory matrix. A synchronizing pulse is produced when the second memory matrix contains predetermined bits of the first and second word.

2 Claims, 4 Drawing Sheets

ARRANGEMENT FOR PRODUCING A SYNCHRONIZING PULSE

BACKGROUND OF THE INVENTION

The invention relates to a sync circuit arrangement for producing a synchronizing pulse upon detection of a frame codeword containing a multiplicity of repeated first words and at least one second word.

Such a circuit arrangement is known from EP-A2 0 103 163. Such an arrangement is necessary, for example, when a frame-structured binary signal is to be partitioned into sub-signals by means of a demultiplexer. Especially the partitioning of a synchronous transport modules STM-16 into four synchronous transport modules STM-4 (cf. in this respect the CCITT Recommendations G 707, G 708, G 709) is considered here and in the following embodiments. The frame codeword of a synchronous transport module STM-16 is 768 bits long and consists of 48 repetitions of a word A1 having the bit sequence 11110110, as well as subsequent forty-eight repetitions of a second word A2 having the bit sequence 00101000.

Producing a synchronizing (sync) pulse from such a frame codeword with the prior-art circuit arrangement would imply considerable circuitry and cost. For example, the first memory matrix used for storing the incoming bit stream so that it can be compared with the known codeword should then comprise 771 memory locations that can be queried.

SUMMARY OF THE INVENTION

Therefore, it is an object of the invention to provide a circuit arrangement of the type mentioned in the preamble, which is also capable of converting frame codewords of an STM-16 module into sync pulses with considerable less circuitry and cost.

In a sync circuit according to the invention, n counters are associated with n groups of memory locations in the first memory for counting the number of times that the respective memory group contains the first word, and provides a pulse when a predetermined number have been identified. The counter outputs control multiplexers which in turn are connected to a second memory matrix where a portion of the first word and a portion of the second word are stored.

In a preferred embodiment, a sync pulse is produced when the requisite bits are in the second memory matrix, and at least one counter pulse has been produced within a predetermined period of time.

With the aid of an embodiment and with reference to the drawing figures the invention will be further explained.

DESCRIPTION OF THE PREFERRED EMBODIMENT

Figure 1:
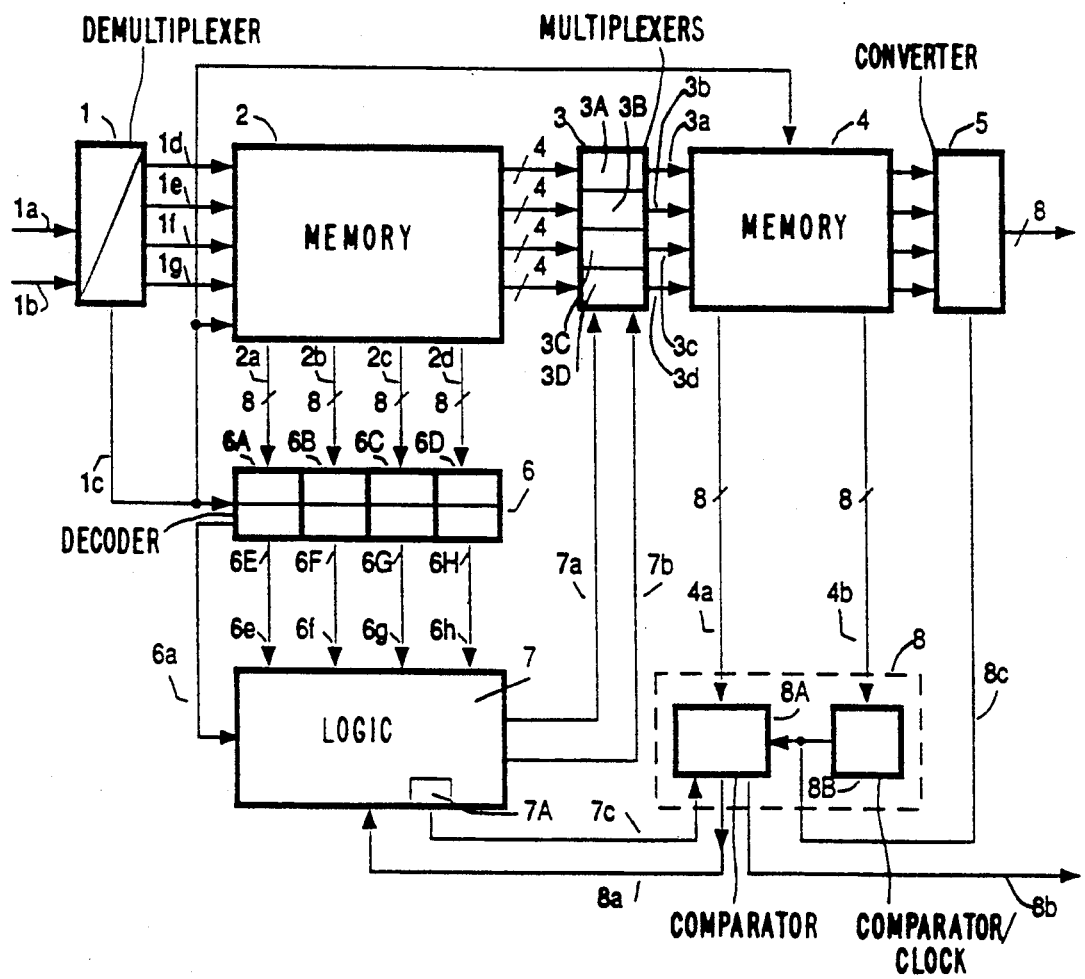
FIG. 1 shows a basic circuit diagram of an arrangement according to the invention.

In FIG. 1 a binary signal comprising STM-16 frames is applied to a demultiplexer over a line 1a. The demultiplexer 1 receives the associated bit clock over a line 1b. The demultiplexer 1 conveys four (the parameter n in the teaching of the claim 1 is thus 4) parallel bit streams over lines 1d to 1g to a memory matrix 2. Simultaneously, the demultiplexer produces a clock signal over line section 1c, whose frequency is a quarter of the bit clock. The signals 1d to 1g are transported through four shift registers in the first memory matrix 2 at the clock rate 1c. The individual shift registers consist of flip-flops as will become more apparent hereinbelow. The memory matrix 2 comprises a total of eleven flip-flops. The Q or O outputs (the negative output is referenced by means of a dash underneath the Q) of each eight of these flip-flops are applied to a decoder circuit 6 over eight-wire lines 2a to 2d.

The decoder circuit 6 comprises, in essence, four query units 6A to 6D having eight inputs each and subsequent counters 6E to 6H. If a binary "one" is available at the output of one of these query units, the count of the subsequent counter is incremented by unity.

In the following descriptions no sharp distinction is made between the reference numeral for a line and the one for the signal transmitted over this line. If one of the counters 6E to 6H has reached the count of four, it will produce a pulse on the associated output line 6e to 6h. An addressing logic 7 converts this pulse into a binary number which is transmitted over lines 7a, 7b to a multiplex circuit 3. This binary number controls four multiplexers 3A to 3D whose inputs are connected to the outputs of specific memory locations of the memory matrix 2. Consequently, as will be further explained hereinbelow, the bits are re-sorted in such a way that the first bit of a word A1 is transmitted over a line 3a, the second bit over a line 3b etc. and the fifth bit again over the line 3a to a second memory matrix 4.

The second memory matrix 4 also comprises four shift registers. Each shift register has only two stages so that the memory matrix 4 comprises a total of eight memory locations (flip-flops). The Q outputs of the eight flip-flops are connected to a comparing circuit 8 once over an eight-wire line 4a and once over an eight-wire line 4b. The functional unit 8B of the comparing circuit 8 verifies whether the second stages of the four shift registers comprise the first four bits of the word A1 and whether the first stages of the four shift registers comprise the last four bits. If they do, a bit-synchronous clock signal 8c is transmitted to the functional unit 8A. This unit verifies whether the last four bits of an A1 word are contained in the second stages of the shift registers and whether the first four bits of an A2 word are contained in the first stages of the four shift registers. The unit 8A produces with the byte clock 8c of unit 8B the sync pulse over a line 8b if the requirement verified by unit 8A is fulfilled. The outputs of the four shift registers of the memory matrix 4 lead to a serial-to-parallel converter 5 which converts four parallel bits into eight parallel bits i.e. bytes and lead to subsequent units (not shown). The converter 5 receives the necessary byte clock over a line 8c.

In order to increase the reliability for the proper production of a sync pulse, a window circuit 7A is provided which transmits a pulse to the unit 8A over a line 7c. During this pulse it is possible to produce a sync pulse. The window circuit 7A does not produce the pulse until one of the counters 6E to 6H has transmitted a pulse to the addressing logic 7 during the preceding eight counter clock signals.

Figure 2:
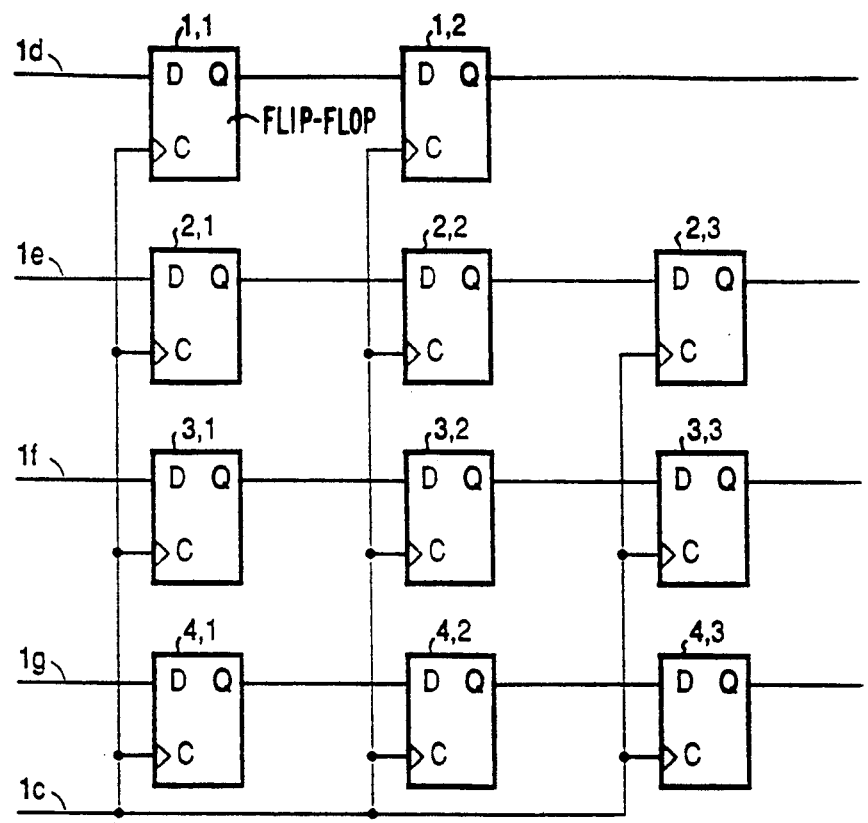
FIG. 2 shows the inner structure of a memory matrix.

FIG. 2 shows the inner structure of the memory matrix 2. The shift registers of the memory matrix 2 comprise consecutively arranged flip-flops
1,1; 1,2
2,1; 2,2; 2,3
3,1; 3,2; 3,3
4,1; 4,2; 4,3.

The four serial data streams are applied to the shift registers over the lines 1d to 1g, the necessary clock signal over the line 1c. The word A1 comprising eight bits may now be transported through the shift registers in a total of four different way: during a clock period of the clock signal 1c either the first bit of the word A1 is stored in the flip-flop 2, 3, the second bit in the flip-flop 3, 3, the third bit in the flip-flop 4, 3, the fourth bit in the flip-flop 1, 2 etc., or the sequence of these bits starts in the same order at flip-flop 3, 3 or 4, 3 or 1, 2 respectively. Which of these memory conditions actually occurs is determined, for example, by the decoder circuit 6.

Figure 3:
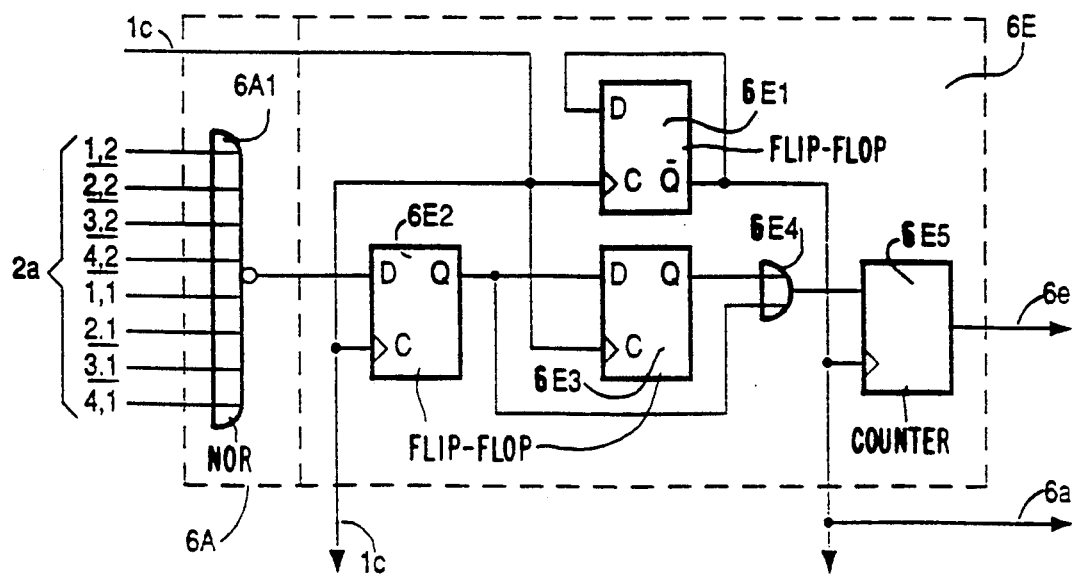
FIG. 3 shows a query circuit and a counter both forming part of a decoder circuit.

FIG. 3 gives a detailed representation of part of the decoder circuit 6, that is to say, the query unit 6A and the counter 6E. The other modules of the decoder circuit 6 are identical with the units 6A and 6E shown, except for a flip-flop 6E1 for clock reduction.

The query unit 6A comprises a NOR gate 6A1 having eight inputs which are connected to either the Q or O outputs of the flip-flops of the first memory matrix 2. This gate 6A1 is used for interrogating whether the word A1 is stored or not in the last of the above-mentioned positions. The other positions are interrogated by the remaining units of the decoder circuit 6. The digits at the inputs of the gate 6A1 denote the flip-flop the inputs are connected to. If the digits are not underlined, it is the Q output of the associated flip-flop that is concerned, otherwise the O output. Not until a bit string as that of the word A1 is stored in the flip-flop, will the output variable of the gate 6A1 adopt the value of 1.

This value is transmitted to the counter 6E and taken over in a flip-flop 6E2 with the clock 1c. A further flip-flop 6E3 and an OR gate 6E4 are used for extending the pulse linked with this "one". The two inputs of the gate 6E4 are connected to the Q output of the two flip-flops 6E2 and 6E3. The output of the gate 6E4 is connected to the data input of a counter circuit 6E5. The extended pulse is timed in the first or second half with a clock 6a which is derived from the clock 1c by means of a divider flip-flop 6E1.

The counter circuit 6E5 comprises a four-stage shift register (not shown) and an AND gate, whose output variable will not adopt the value of 1 and transport same over the line 6e until a binary "one" is stored in all four stages.

Figure 4:
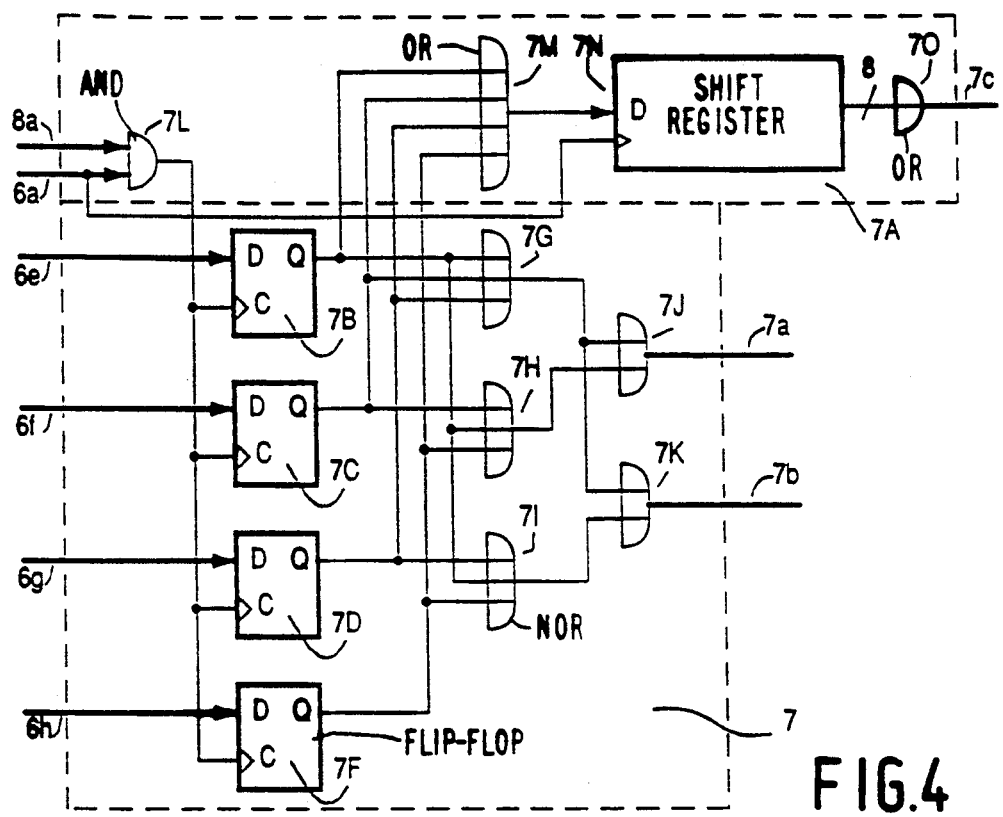
FIG. 4 shows the inner structure of an addressing logic and a window circuit.

Details of the addressing logic 7 and of the window circuit 7A considered part thereof are shown in FIG. 4. The pulses produced by the counters are transferred to four flip-flops 7B to 7F over the lines 6e to 6h with the clock 6a. The transfer with the clock 6a is effected only when a gate 7L is opened as a result of a pulse 6a. The further embodiments to be discussed hereinafter will show when this pulse for opening the gate 7L is produced.

The Q outputs of the four flip-flops 7B to 7F are interconnected by means of five gates 7G to 7K in such a way that each of the five optional states at the Q outputs, that is to say, (1000), (0100), (0010), (0001) and (0000) is unambiguously shown by means of a two-digit binary number. For example, the state (1000) is represented by the binary number 11, that is to say, a "one" is transmitted over both lines 7a and 7b. The states (0000) and (0001) are both represented by means of the binary number 00.

The window circuit 7A comprises an OR gate 7M whose four inputs are connected to the Q outputs of the four flip-flops 7B to 7F. The output variable of the gate 7M will not adopt the value of 1 for a duration of the clock signal 6a until one of the counters 6E to 6H has produced a pulse. The binary values occurring at the output of the gate 7M are transported through an eight-stage shift register 7N with the clock 6a. The outputs of the eight stages of the shift register 7N are connected to the eight inputs of an OR gate 70 whose output line conveys a signal to the comparing circuit 8 which circuit prevents with this signal a sync pulse from being produced. The sync pulse is only prevented from being produced when a binary "zero" has been stored in all the stages of the shift register 7N. Worded differently: the production is especially prevented when none of the counters 6E to 6H have produced a pulse in the eight preceding clock periods of the shift clock 6a. These requirements make the occurrence of erroneous sync pulses highly unlikely.

Figure 5:
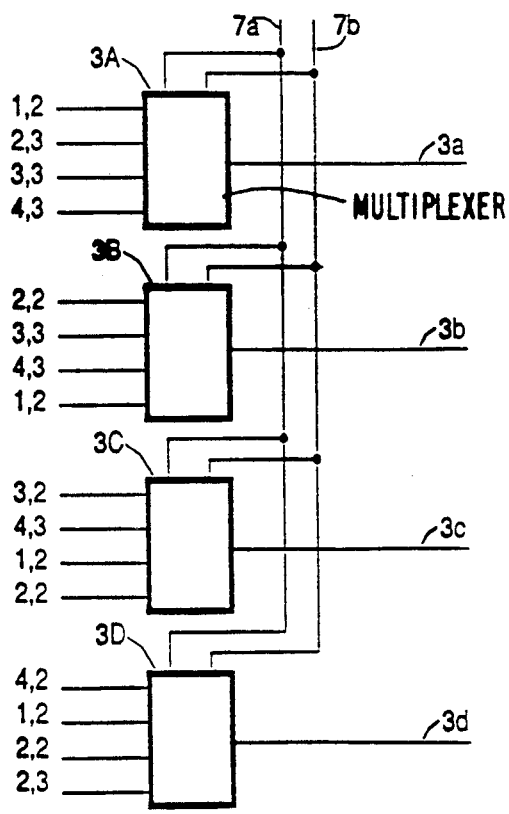
FIG. 5 shows the inner structure of a multiplex circuit.

The multiplex circuit shown in FIG. 5 is controlled by means of the binary numbers over the lines 7a and 7b. The circuit comprises four 1:4 multiplexers 3A, 3B, 3C and 3D. As a result of the binary number at the address inputs of the multiplexers, the input denoted by the address is connected to the output of the multiplexer. The inputs of the multiplexers 3A to 3D are connected to Q outputs of specific flip-flops of the memory matrix 2. Again the digits at the inputs of the multiplexers 3A to 3D denote the flip-flops concerned. The selection of the flip-flops and the addresses on the lines 7a and 7b are harmonized in such a way that the first or the last four bits of the word A1 are transmitted over the lines 3a to 3d in the same order as the order in which also the lines 3a to 3d are numbered. The bits of the words A1 are in a way pre-sorted byte-by-byte.

Figure 6:
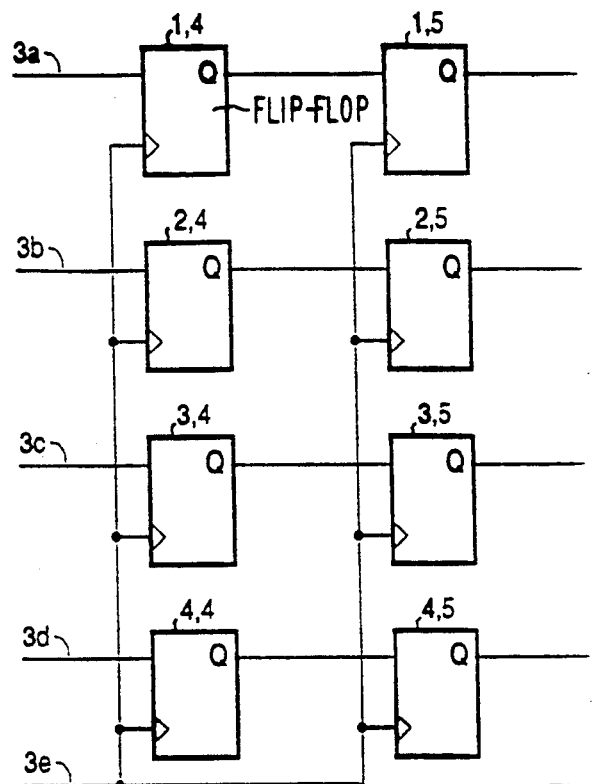
FIG. 6 shows the inner structure of a second memory matrix.

In this state they are buffered in a second memory matrix 4. Such a memory matrix is shown in FIG. 6; It comprises four two-stage shift registers all of them timed with the clock 1c. The individual flip-flops are again denoted by two-digit reference numerals, that is to say, 1,4; 1,5 to 4,4; 4,5. The outputs of the shift registers are connected to the serial-to-parallel converter 5 following in the circuit.

Figure 7:
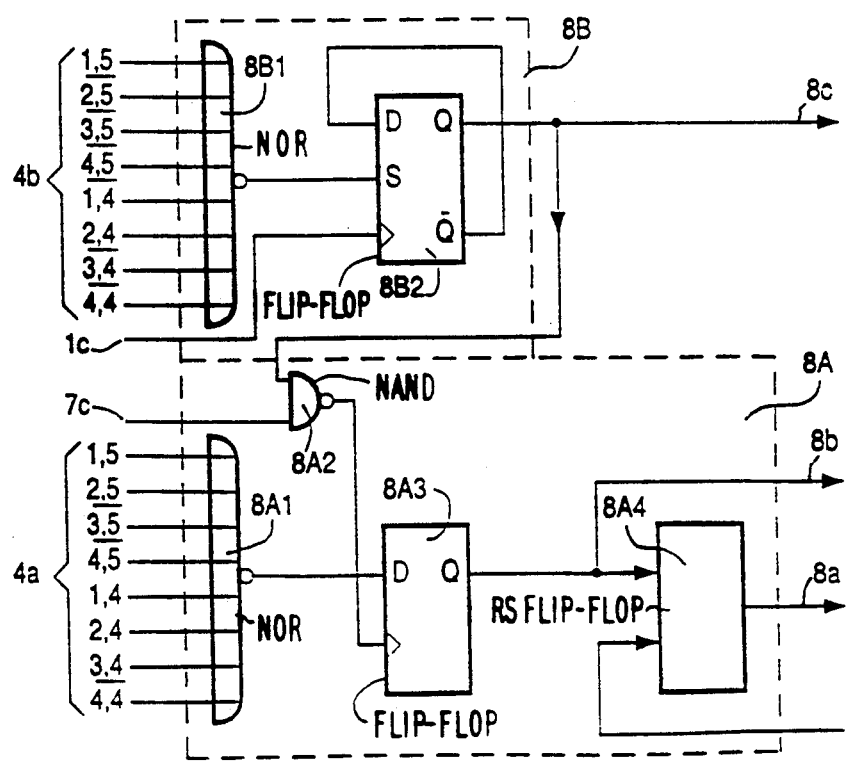
FIG. 7 shows the inner structure of a comparing circuit.

The comparing circuit 8 with its sub-circuits 8A and 8B is shown in FIG. 7. The sub-circuit 8B comprises a NOR gate 8B1, whose eight inputs are connected to the Q or O outputs of the flip-flops of the memory matrix 4. Again it holds that when a reference numeral at the input of the gate 8B1 is underlined, this input is connected to the O output of the associated flip-flop, otherwise to the Q output.

The output variable of the gate 8B1 adopts the value of "one" when the first bit of the word A1 is stored in the flip-flop 1,5, the second bit in the flip-flop 3,5 etc. and, finally the eighth bit in the flip-flop 4,4. This "one" sets a flip-flop 8B2 which divides the clock 1c by two.

The result is a byte clock 8c which is synchronized with the bytes of the STM-16 frame.

The byte clock 8c is applied to the subcircuit 8A in which it passes through a NAND gate 8A2. The gate 8A2 may be blocked by the signal 7c of the window circuit 7A. The consequence of a blocking is that a flip-flop 8A3 retains the value stored prior to the blocking pulse and does not adopt any new value at its Q output from a NOR gate 8A1.

By means of the gate 8A1 it is verified whether the second half of the word A1 is stored in the flip flops 1,5; 2,5; 3,5 and 4,5 of the memory matrix 4 and the first half of the word A2 in the flip flops 1,4; 2,4; 3,4 and 4,4. For the eight inputs and their reference numerals the same holds as for the gate 8B1. The transition from a word A1 to a word A2 only occurs once in the STM-16 frame so that the gate 8A1 produces a pulse at a specific instant of an STM-16 frame, unless inhibited by other circumstances.

In order to eliminate spikes, this pulse is accepted (as a logic "one") in the flip flop 8A3 and transported over the line 8b as a sync pulse for further processing. Simultaneously, it is applied to the set input of an RS flip flop 8A4 that produces the signal 8a for blocking the gate 7L in FIG. 4. This prevents the production of a new sync pulse until the reset input of the flip flop 8A4 receives over a line a request for a new sync pulse.

I claim:

1. A sync circuit for digital apparatus receiving a binary signal including a codeword comprising a first word repeated a plurality of times and a second word, comprising:
   - a demultiplexer for partitioning said binary signal into n parallel subsignals,
   - a first memory matrix comprising n groups of memory locations including n shift registers arranged for transporting said n parallel subsignals in sync through a respective shift register each,
   - a decoder circuit for interrogating said n groups of memory locations in said first memory matrix, and
   - a multiplexer assembly comprising n multiplexers having respective outputs and having inputs respectively connected to outputs of said n memory locations,
   characterized in that said first word occurs at least 2n times in said codeword,
   each interrogation determines whether or not a predetermined one of said words is stored in the respective shift register, and
   said circuit further comprises:
   - n counters for respectively summing the number of interrogations of the respective group of memory locations which have determined that one of said words is stored therein, each counter including means for transmitting a pulse when a predetermined count of the respective counter is exceeded,
   - addressing logic means receiving the pulses from said n counters, and having an output connected to control said multiplexer assembly, said output being a binary number which denotes from which of said counters a pulse has been received,
   - a second memory matrix having n inputs connected respectively to the multiplexer outputs, and respective second memory locations for storing predetermined bits of said first word and said second word respectively under control of the respective outputs of said n multiplexers, and
   - a comparing circuit connected to said second memory matrix for determining whether said predetermined bits are stored in said second memory locations and, responsive to said bits being so stored, producing a sync pulse.

2. A sync circuits as claimed in claim 1, comprising a window circuit for blocking production of a sync pulse if none of said counters have transmitted a pulse to said addressing logic within a preceding time interval of a predetermined length.

* * * * *